No. 842,004. PATENTED JAN. 22, 1907.
S. D. OHARRA.
FENDER.
APPLICATION FILED MAY 3, 1906.
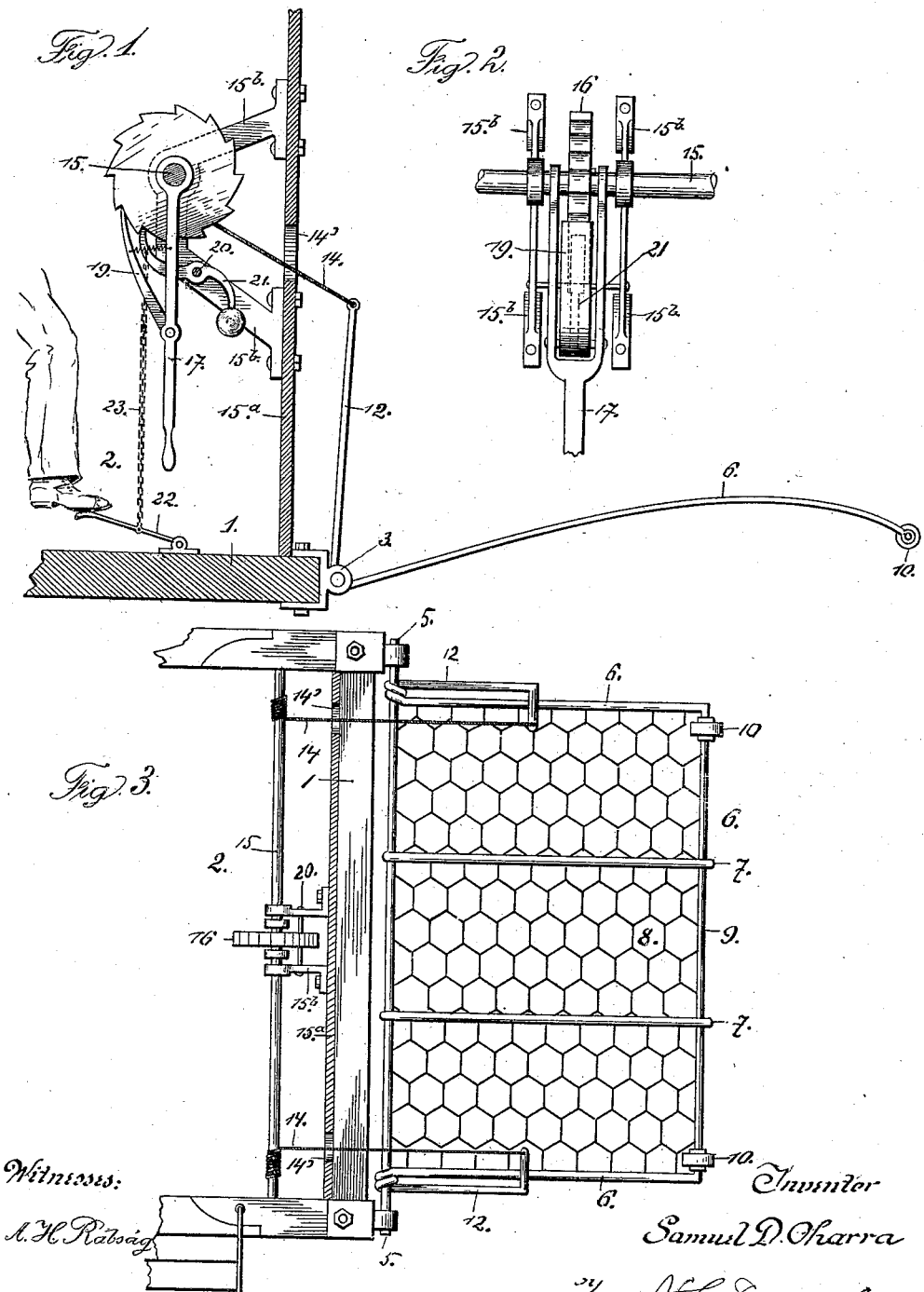
Witnesses:
A. H. Rabság
P. H. Butler
Inventor
Samuel D. Oharra
by H. C. Evert & Co.
Attorneys.

UNITED STATES PATENT OFFICE.

SAMUEL D. OHARRA, OF WEST WASHINGTON, PENNSYLVANIA.

FENDER.

No. 842,004.　　　Specification of Letters Patent.　　　Patented Jan. 22, 1907.

Application filed May 3, 1906. Serial No. 314,992.

*To all whom it may concern:*

Be it known that I, SAMUEL D. OHARRA, a citizen of the United States of America, residing at West Washington, in the county of Washington and State of Pennsylvania, have invented certain new and useful Improvements in Fenders, of which the following is a specification, reference being had therein to the accompanying drawings.

This invention relates to certain new and useful improvements in street-car fenders; and the invention has for its object to provide a fender that will prevent persons from contacting with the trucks and operating mechanism of a car, the fender being constructed to support a person should he accidentally be run down by a car.

In constructing my improved fender I aim to normally maintain the same in an elevated position above the track over which a car travels and employing novel means for automatically releasing the fender to permit it to travel upon the track. In this connection I also employ novel means for elevating a fender after it has been used, said means being constructed whereby it will not be necessary for the motorman of a car to leave his car in order to return the fender to its normal position.

My improved fender is extremely simple in construction, strong and durable, comparatively inexpensive to manufacture, and highly efficient for the purposes for which it is used.

The detail construction of the fender will be hereinafter more fully described and then specifically claimed, and, referring to the drawings accompanying this application, like numerals of reference designate corresponding parts throughout the several views, in which—

Figure 1 is a vertical sectional view of a portion of a car equipped with my improved fender. Fig. 2 is an elevation of a portion of the same, illustrating the actuating mechanism thereof; and Fig. 3 is a plan of the fender.

To put my invention into practice, I provide the platform 1 of a car 2 with outwardly-extending side brackets 3 3 to receive the pintles 5 5 of a rectangular frame 6, which constitutes my improved fender. The frame is provided with longitudinally-disposed braces 7 7 and with a woven-wire fabric 8 or a similar flexible netting. The front rail 9 of the fender-frame 6 is provided with rollers 10 10, adapted to travel upon the track over which the car 2 travels.

The fender-frame 6, at its rear edges, is provided with angularly-disposed arms 12 12, the upper ends of said arms being connected to cables 14 14, which extend rearwardly through openings 14 14', formed in the dashboard $15^a$ of the car, and are wound upon a shaft 15, journaled between brackets $15^b$ $15^b$, carried by the dashboard $15^a$ of the car-platform 1.

Upon the shaft 15 is fixed a ratchet-wheel 16, and loosely mounted upon said shaft is an operating-lever 17, said lever being provided with spring-held pawl 19, said pawl normally engaging the ratchet-wheel 16 of the shaft 15.

The brackets $15^b$ $15^b$ carry a transverse rod 20, upon which is pivoted a weighted pawl 21, adapted to normally engage the ratchet-wheel 16. The platform 1 of the car is provided with a pivoted tread 22, which connects with the weighted pawl 21 by a chain or cable 23, said tread being held in an elevated position by said pawl 21.

In operation the fender-frame 6 is normally maintained in the elevated position, and should a person be accidentally run down by the car the motorman depresses the tread 22 and disengages the pawls 19 and 21 from the wheel 16, the pawl 21 striking the pawl 19, which permits of the fender-frame descending by gravity, the weight of the frame unwinding the cable 14 from the shaft 15. After the fender-frame has served its purpose the motorman or operator of the car 2 oscillates the lever 17, which, through the medium of the pawl 19, rotates the shaft 15 and winds the cables 14 14 upon said shaft to maintain the fender-frame 6 in its original and normal position. During this operation the weighted pawl 21 serves to lock the ratchet-wheel 16, preventing a rearward rotation of said ratchet-wheel, and consequently by a few oscillating movements of the lever 17, the fender-frame can be easily and quickly returned to its normal position.

I do not care to confine myself to the type of fender-frame shown, and such changes in the construction and operation of the fender as are permissible by the appended claims may be resorted to without departing from the spirit and scope of the invention.

What I claim, and desire to secure by Letters Patent, is—

1. In a fender, the combination with the dashboard and platform of a car, of brackets carried by said platform and said dashboard, a fender-frame pivotally mounted between the brackets of said platform, rollers journaled upon the forward edge of said frame and adapted to travel upon the track over which the car passes, angularly-disposed arms carried by said frame, a shaft journaled in the brackets of said dashboard, cables wound upon said shaft and connecting with said arms, a ratchet-wheel carried by said shaft, an operating-lever loosely mounted upon said shaft, a pawl carried by said lever and engaging said wheel, a weighted pawl engaging said wheel, and means to simultaneously release both of said pawls, substantially as described.

2. In a fender, the combination with the platform of a car, of a fender-frame carried by said platform, a shaft journaled above said platform, cables wound upon said shaft and connecting with said frame, means to rotate said shaft to elevate said fender-frame, and means to release the last-named means, substantially as described.

In testimony whereof I affix my signature in the presence of two witnesses.

SAMUEL D. OHARRA.

Witnesses:
A. C. MITCHELL,
JOHN REED.